(12) United States Patent
Lombard et al.

(10) Patent No.: US 10,663,339 B1
(45) Date of Patent: May 26, 2020

(54) POWDER SCOOPER WITH A FUNNEL

(71) Applicants: Coop Holdings, LLC, Plantation, FL (US); Hector Lombard, Boca Raton, FL (US)

(72) Inventors: Hector Lombard, Plantation, FL (US); Mark Johnson, Plantation, FL (US)

(73) Assignees: Coop Holdings, LLC, Plantation, FL (US); Hector Lombard, Boca Raton, FL (US)

( * ) Notice: Subject to any disclaimer, the term of this patent is extended or adjusted under 35 U.S.C. 154(b) by 0 days.

(21) Appl. No.: 16/676,402

(22) Filed: Nov. 6, 2019

Related U.S. Application Data

(60) Provisional application No. 62/756,579, filed on Nov. 6, 2018.

(51) Int. Cl.
*G01F 19/00* (2006.01)
*A47J 47/01* (2006.01)
*A47J 43/28* (2006.01)

(52) U.S. Cl.
CPC .............. *G01F 19/002* (2013.01); *A47J 43/28* (2013.01); *A47J 47/01* (2013.01)

(58) Field of Classification Search
CPC ................................ G01F 19/00; G01F 19/002
USPC ........................................................... 73/426
See application file for complete search history.

(56) References Cited

U.S. PATENT DOCUMENTS

| 1,175,709 | A | 3/1916 | Cole |
| 6,895,672 | B2 * | 5/2005 | Conforti ............... A47J 43/288 |
| | | | 15/236.01 |
| 6,974,056 | B2 | 12/2005 | Rea |
| 8,534,502 | B2 | 9/2013 | Gold et al. |
| 8,579,145 | B2 | 11/2013 | Gold et al. |
| 9,055,844 | B2 * | 6/2015 | Schuelke ............... B65D 25/48 |
| 9,283,013 | B2 * | 3/2016 | Shimko ..................... A61F 2/28 |
| 2008/0099512 | A1 | 5/2008 | Hoffman et al. |
| 2009/0107581 | A1 | 4/2009 | Sayage |
| 2016/0209258 | A1 * | 7/2016 | Montarras ............... A47F 13/08 |
| 2018/0010946 | A1 * | 1/2018 | Warren ................... B65D 83/06 |

FOREIGN PATENT DOCUMENTS

JP            2008145407 A  *  6/2008

* cited by examiner

*Primary Examiner* — Jamel E Williams
(74) *Attorney, Agent, or Firm* — Mark C. Johnson; Johnson | Dalal

(57) ABSTRACT

A powder scooper with a funnel having a unitary body with a bottom wall and a sidewall both defining a scooping cavity, wherein the sidewall defines a funnel entrance aperture and has an upper terminal edge defining an upper aperture. The scooper also includes a funnel portion coupled to the sidewall and a distal terminal end defining a distal opening, and a funnel channel separating the funnel entrance aperture and the distal opening, wherein the funnel portion extends outwardly away from an outer surface of the sidewall. The scooper also includes a handle portion coupled to, and extending outwardly away from, the outer surface of the sidewall in a substantially perpendicular orientation and angle of a funnel axis defined by the funnel channel.

18 Claims, 5 Drawing Sheets

POWDER SCOOPER WITH A FUNNEL

CROSS-REFERENCE TO RELATED APPLICATION

This application claims priority to U.S. Provisional Patent Application No. 62/756,579, filed Nov. 6, 2018, the entirety of the same is incorporated by reference.

FIELD OF THE INVENTION

The present invention relates generally to powder scoopers, and, more particularly, relates to powder scoopers with funnels.

BACKGROUND OF THE INVENTION

Generally, a scoop is any specialized holding device or container used to serve a food substance. As it relates to powder substances, e.g., protein powder, baby formula, etc., it can be often be very difficult and time-consuming to manipulate, contain, and pour the powder. These challenges are exacerbated with very fine powder substances and when pouring the powder substances into a container with a narrow neck or opening on the container, e.g., a water bottle.

To address some of the above-referenced challenges, some scooping devices have included an incorporated funnel. One such scooping device includes the scooping portion with a holding cavity disposed at one end of the scooping device and a funnel, defining a funnel channel, disposed at an opposing end of the scooping device. As such, when the powder is housed in the holding cavity, the user will then turn the scooping device approximately 90° to allow the housed powder to pour out of the scooping device into a secondary container. Problematically, these scooping devices permit inadvertent release of the powder before desired by the user. To address these problems, some of these scooping devices have caps selectively removably couplable to one or more of the ends. However, these scooping devices are time-consuming to open and close and still permit inadvertent release of powder. These scooping devices also prevent or inhibit the user from sufficiently measuring the powder housed in the scooping device.

Therefore, a need exists to overcome the problems with the prior art as discussed above.

SUMMARY OF THE INVENTION

The invention provides a powder scooper with a funnel that overcomes the hereinafore-mentioned disadvantages of the heretofore-known devices and methods of this general type and that effectively and efficiently houses and dispenses a powdery substance.

With the foregoing and other objects in view, there is provided, in accordance with the invention, a powder scooper with a funnel having a unitary body with a scooping portion that includes a bottom wall and a sidewall surrounding the bottom wall. Both the bottom wall and the sidewall define a scooping cavity, wherein the sidewall defines a singular funnel entrance aperture and having an upper terminal edge defining an upper aperture. The powder scooper also includes a funnel portion coupled to the sidewall. The funnel portion has a distal terminal end defining a distal opening and defines a funnel channel separating the singular funnel entrance aperture and the distal opening. The funnel portion also extends outwardly away from an outer surface of the sidewall. The scooper also includes a handle portion coupled to, and extending outwardly away from, the outer surface of the sidewall in a substantially perpendicular orientation and angle of a funnel axis defined by the funnel channel.

In accordance with another feature, an embodiment of the present invention includes a hood portion with a lower end coupled to the upper terminal edge of the sidewall, partially covering the upper aperture to define an entrance aperture, and disposed directly above a portion of the sidewall defining the singular funnel entrance aperture.

In accordance with a further feature of the present invention, the scooping cavity is of a hemi-spherical shape.

In accordance with yet another feature, an embodiment of the present invention also includes the hood portion having a hood wall with a continuous outer perimeter edge defining the entrance aperture, the hood wall extending upwardly away from the portion of the sidewall defining the singular funnel entrance aperture.

In accordance with an additional feature, an embodiment of the present invention also includes the hood portion having an inner surface of a concave shape. The hood portion may also include an outer lip disposed proximal to handle plane defined by a handle axis of the handle portion. The hood portion may also include an outer surface of a concave shape.

In accordance with an exemplary feature, an embodiment of the present invention also includes the handle portion also having a handle axis spanning through a centroid defined thereon, wherein the handle axis disposed at the substantially perpendicular angle with respect to the funnel axis.

In accordance with yet another feature of the present invention, the handle axis and the funnel axis are substantially co-planar.

In accordance with a further feature of the present invention, the outer surface of the sidewall includes a plurality of measurement indicia disposed thereon and located on an opposing side of the sidewall defining the singular funnel entrance aperture.

In accordance with an additional feature of the present invention, the funnel entrance aperture is a singular aperture defined thereon.

In accordance with an additional feature of the present invention, the hood portion is selectively removably coupled to the upper terminal edge of the sidewall in a snap-tight configuration.

Although the invention is illustrated and described herein as embodied in a powder scooper with a funnel, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the handle portion.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
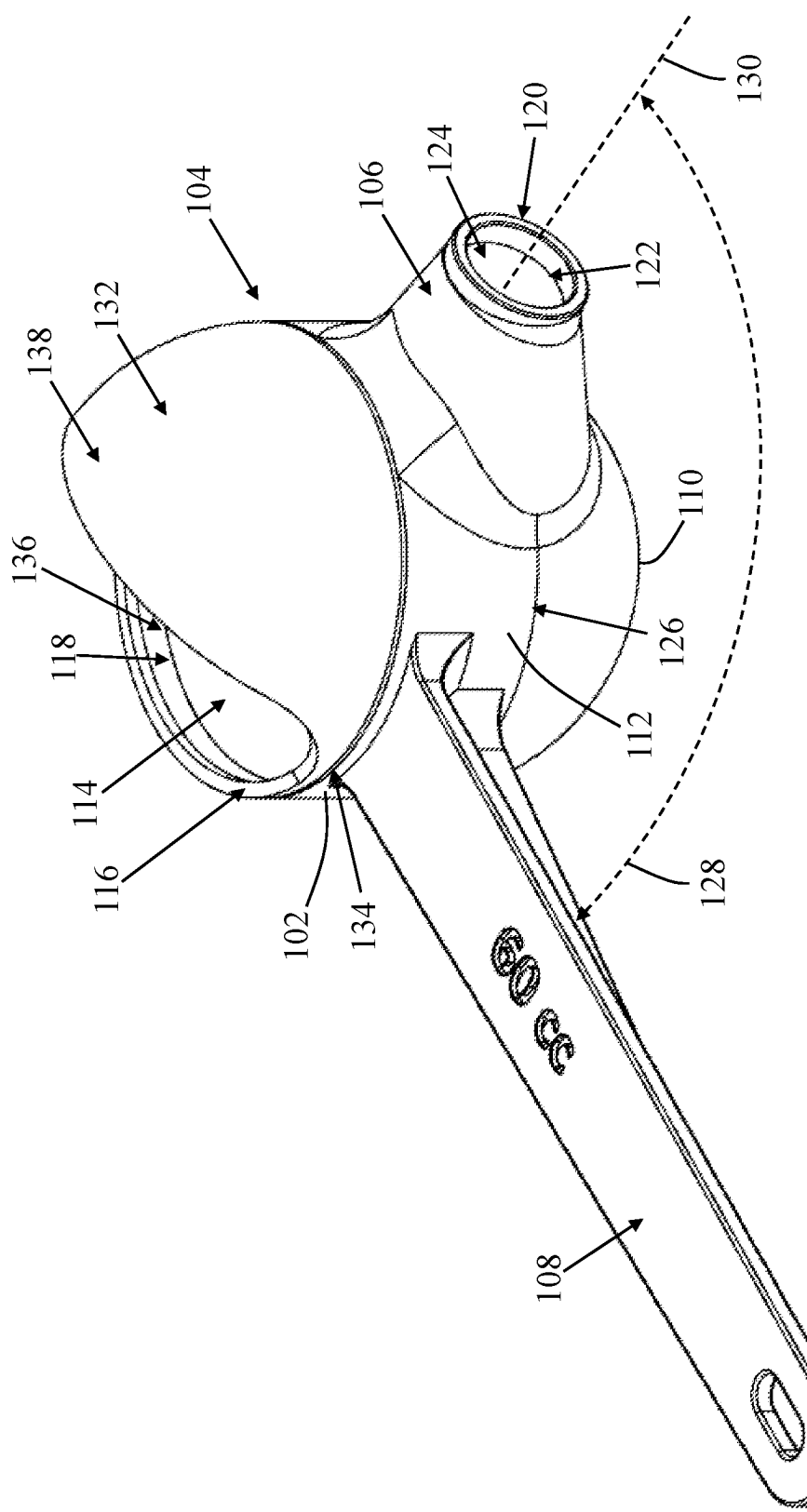
FIG. 1 is a perspective rear view of a powder scooper with a funnel in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient powder scooper that effectively and efficiently scoops, i.e., receives, a powder substance, while simultaneously being operable to pour or dispense said powder substance without any inadvertent spillage of said powder. To that end, referring now to FIG. 1, one embodiment of the present invention is shown in a perspective view. FIG. 1, along with the other figures herein, shows several advantageous features of the present invention, but, as will be described below, the invention can be provided in several shapes, sizes, combinations of features and components, and varying numbers and functions of the components. While having particular and unique benefits associated with retaining and dispensing a fine powder substance, the scoop 100 may also be beneficially for other food or powdery substances.

More specifically, the powder scooper 100 can be seen with an incorporated or integrated a funnel thereon. The scooper can be seen having a unitary body 102 with multiple portions 104, 106, 108, 132. The scooper body 102 is "unitary" in the sense that it is operated as one single piece moving together (ideally with a single hand of a user). In one embodiment, one or more of the portions 104, 106, 108, 132 may be formed from a single piece of material, e.g., through a casting process, while in other embodiments the portions 104, 106, 108, 132 may be individually formed and joined or coupled together, e.g., using fastener(s), adhesive, sonic welding, etc. One or more of the portions 104, 106, 108, 132 may also be made of a polymeric material such as polypropylene, a ceramic material, a metallic material, or a combination of the same. The portions 104, 106, 108, 132 are preferably substantially rigid, i.e., having a material hardness ranging from at least 10-80 Shore D.

Figure 2:
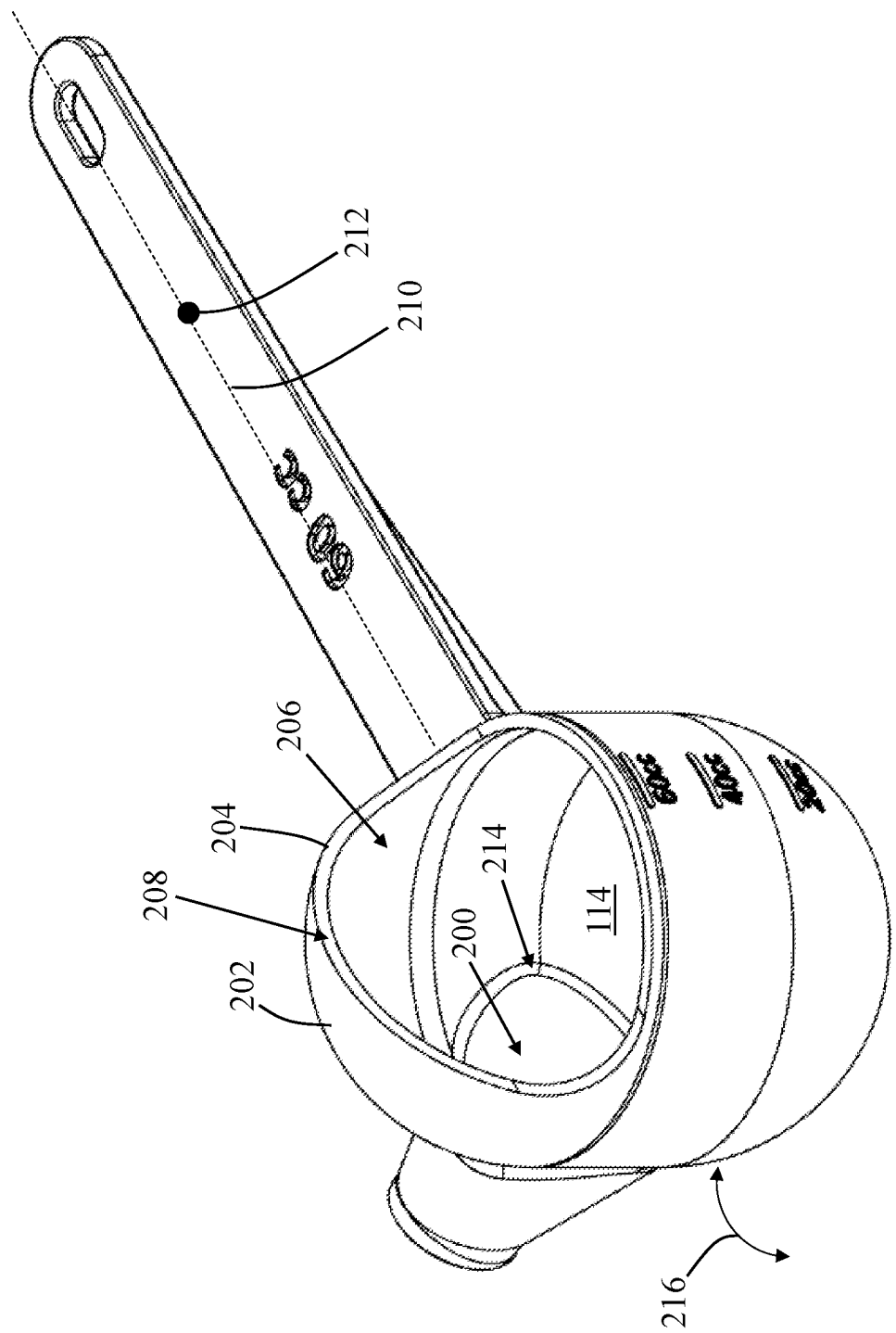
FIG. 2 is a perspective front view of the powder scooper in FIG. 1.

As best seen in FIGS. 1-2, the scooping portion 104 includes a bottom wall 110 and a sidewall 112 surrounding the bottom wall 110. Both the bottom wall 110 and the sidewall 112, namely the inner surfaces thereon, define a scooping cavity 114. As seen in the figures, the inner surfaces defining the scooping cavity may form a hemispherical-shaped cavity 114 that effectively enables movement and measuring of the powder substance when retained therein. The inner surfaces defining the scooping cavity may also be smooth and preferably have a low coefficient of friction, i.e., less than approximately 0.5. As used herein, the term "wall" is intended broadly to encompass continuous structures, as well as, separate structures that are coupled together to form a substantially continuous external surface.

The sidewall 112 may also define a funnel entrance aperture 200 and include an upper terminal edge 116 defining an upper aperture 118. In a preferred embodiment, the funnel entrance aperture 200 is a singular aperture defined on the sidewall 112 to effectively transport and dispense the powdery substance housed in the scooper 100. In other embodiments, there may be another entrance aperture 200 defined by the sidewall 112. Additionally, the entrance aperture 200 may be defined by a curved and tapering inner surface perimeter 214 of the sidewall 112. The curved and tapering inner surface perimeter 214 facilitates in directing all of the retained powdery substance (represented best in FIG. 4 as numeral 400) into a funnel channel 124 defined by the funnel portion 106 of the device 100 and, ultimately, out of the device 100.

Figure 4:
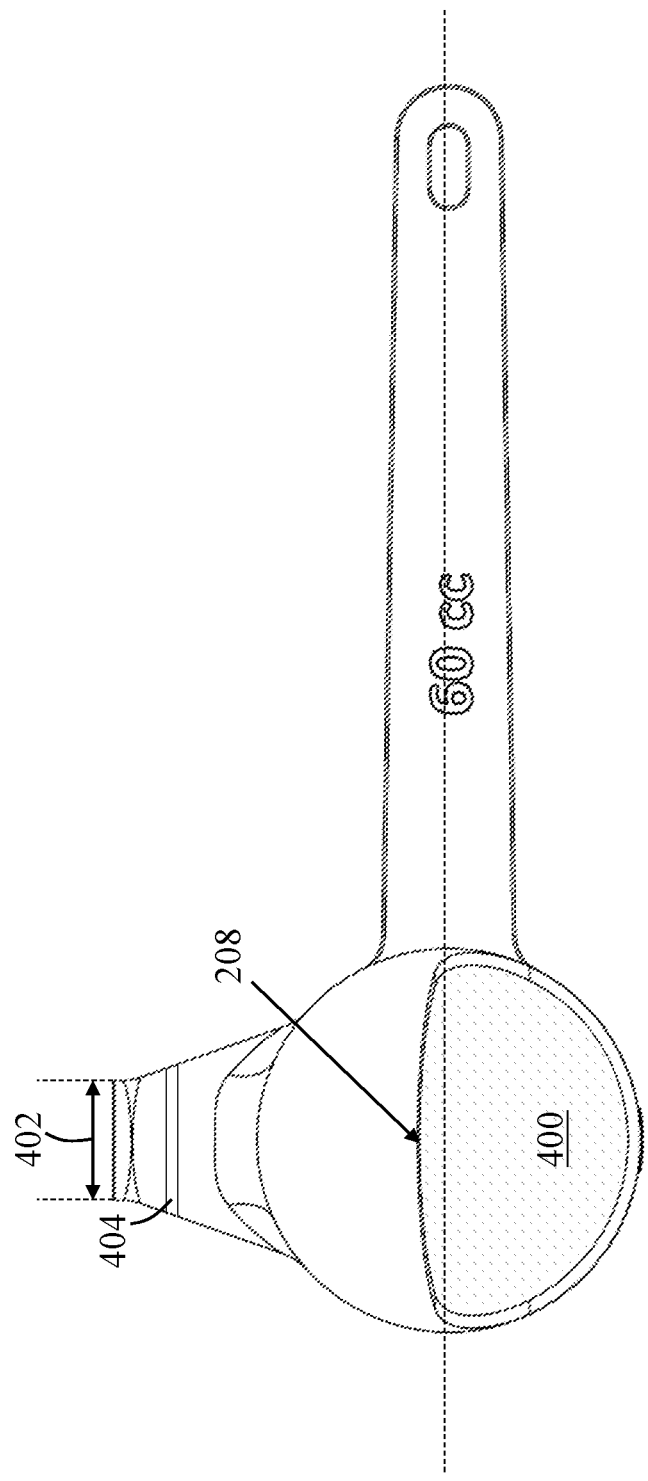
FIG. 4 is a top plan view of a powder scooper with a funnel powder scooper in accordance with another embodiment of the present invention.

Referring to FIGS. 1-2 and FIG. 4, the funnel portion 106 can be seen coupled to the sidewall 112, having a distal terminal end 120 defining a distal opening 122, and defining the funnel channel 124 separating the funnel entrance aperture 200 and the distal opening 122. In one embodiment, the maximum outer diameter or width 402 of the funnel portion 106, namely the distal terminal end 120, is approximately 2 inches in order to effectively enter an opening on a container opening, e.g., the distal opening on a water bottle, with the funnel portion 106. In another embodiment of the present invention, the outer surface of the funnel portion 106 may include a flanged funnel member 404. The flanged funnel member 404 may serve at least two purposes. First, the flanged funnel member 404 may be of a deformably resilient material, e.g., natural rubber, that is operably configured to seal the funnel portion 106 with respect to the container to which the powder is being dispensed. Additionally, the flanged funnel member 404 may act as a stop for preventing the funnel from entering the container opening after a particular distance, e.g., approximately 1 inch. To that end, the funnel portion 106 can be seen extending outwardly away from an outer surface 126 of the sidewall 112 and may extend a length of approximately 1-3 inches (depending on the design application).

The handle portion 108 of the scooper can be seen coupled to, and extending outwardly away from, the outer surface 126 of the sidewall 112 in a substantially perpendicular orientation and angle 128 of a funnel axis 130 defined by the funnel channel 124. Said differently, the scooper is advantageously configured with the handle portion 108 and the distal opening 122 in an orientation enabling the user to scoop the powdery substance 400, level the scooper (as seen in the figures), and then, once desired for dispensing, rotate the device 100 approximately 90° (represented with arrow 216 in FIG. 2), i.e., 90°+/−approximately 15-20° with respect to the level position, thereby facing the distal opening 122 toward a ground surface or container opening. The rotation of the device 100 using the handle portion 108 then forcefully dispenses the powdery substance 400 using gravity. In other embodiments, the handle portion 108 may extend outwardly away from the outer surface 126 of the sidewall 112 in a substantially parallel orientation and angle (i.e., substantially 180°) of a funnel axis 130 defined by the funnel channel 124. The handle portion 108 may be substantially planar (as shown in the figures), or may be of another shape for handling and manipulation by the user.

Figure 3:
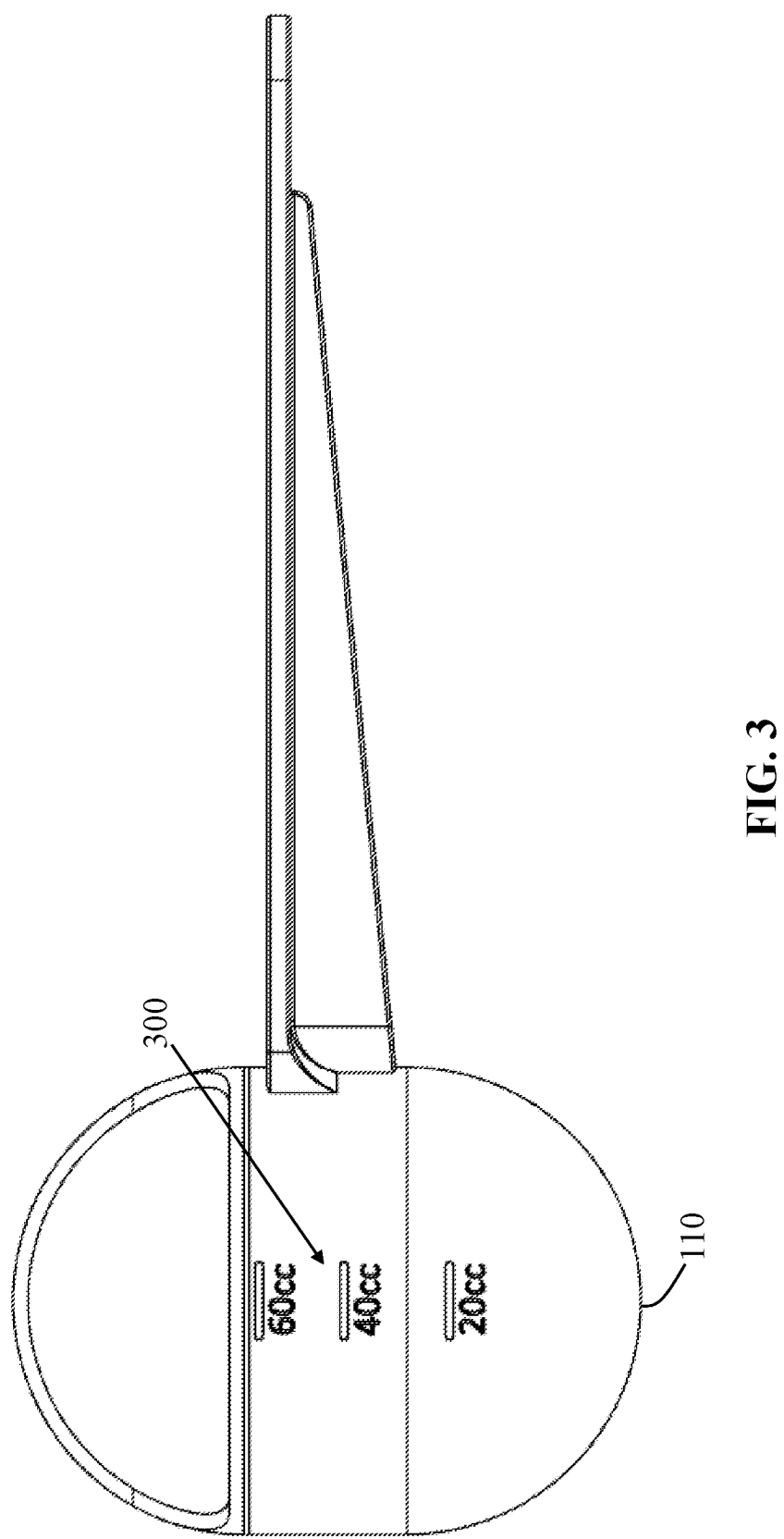
FIG. 3 is an elevational front view of the powder scooper in FIG. 1.

In one embodiment, the scooping cavity 114 may hold approximately 60-90 cc of powder (whether in the level orientation or position or in when the device is in the rotated position, i.e., the device 100 is rotated approximately 90°. In other embodiments, the volume or capacity of the scooping cavity 114 may vary outside of said ranges. To facilitate in measuring the amount of powder to be dispensed, the outer surface 126 of the sidewall 112 includes a plurality of measurement indicia (shown best in FIG. 3 as numeral 300) disposed thereon and located on an opposing side of the sidewall 112 defining the singular funnel entrance aperture 200. The measurement indicia may be demarcation lines with corresponding values indicating the volume value for each demarcation line.

In one embodiment, the scooper 100 includes a hood portion 132 with a lower end 134 coupled to the upper terminal edge 116 of the sidewall 112. The hood portion 132 may be substantially planar (not shown in the figures) and may partially cover the upper aperture 118 to define an entrance aperture 136 where powder is able to enter the scooping cavity 114. The hood portion 132 is positioned or disposed directly above a portion of the sidewall 112 defining the singular funnel entrance aperture 200 (as best seen in FIG. 1). The hood portion 132 may be selectively removably coupled to the upper terminal edge 116 of the sidewall 112 in a snap-tight configuration, i.e., being flexible and retained thereon using a ridge/recess/channel. In other embodiments, the hood portion 132 may be selectively removably coupled to the upper terminal edge 116 using a different tongue-and-groove configuration. The hood portion 132 beneficially facilitates in keeping the powder housed with the device 100 is rotated and directing the powder when the user desires to dispense the powder.

In other embodiments, the hood portion 132 may also include a hood wall 202 with a continuous outer perimeter edge 204 defining the entrance aperture 136 (also referred to as a "mouth"). The hood wall 202 may extend upwardly away from the portion of the sidewall 112 defining the singular funnel entrance aperture 200. Further, the hood portion 132 may include an inner surface 206 of a concave shape and an outer surface 138 of a concave shape.

As best seen in FIG. 4, an outer lip 208 of the hood portion 132 may be disposed proximal to a handle plane 400 defined by a handle axis 210 of the handle portion 108 to effectuate holding the powder when rotated into the dispensed position. Said another way, the outer lip 208 of the hood portion 132 may disposed at or near, within approximately 0.25-0.5 inches, the handle plane 400 defined by the handle axis 210 of the handle portion 108.

Figure 5:
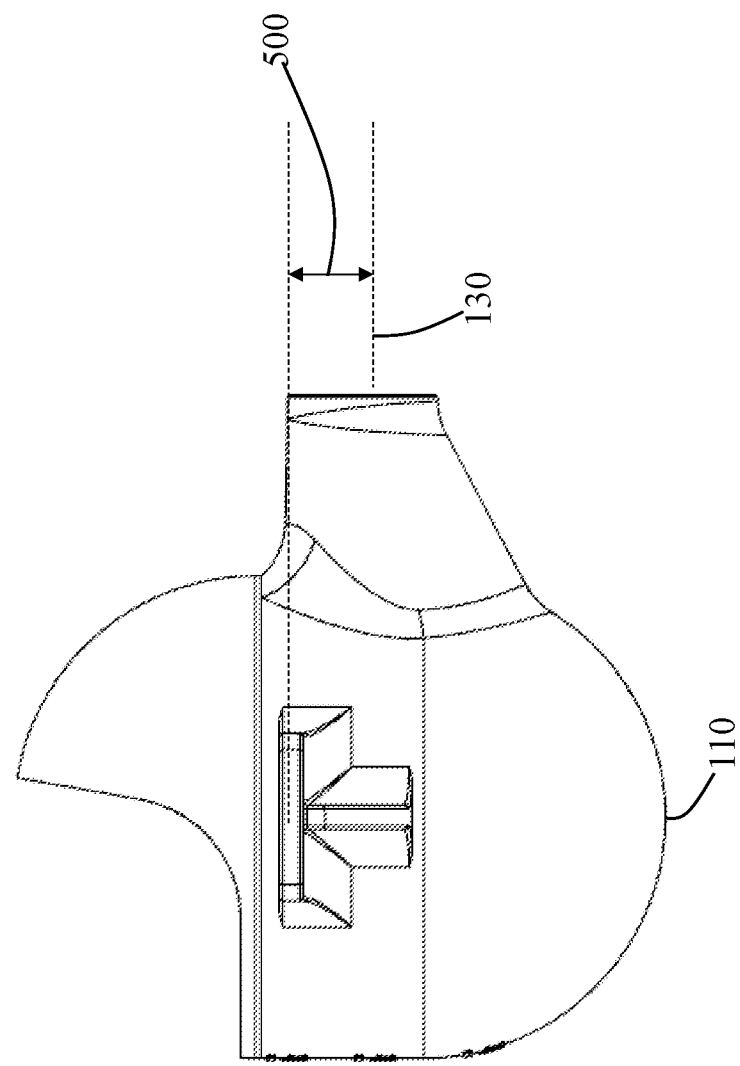
FIG. 5 is an elevational side view of the powder scooper in FIG. 1.

Referring back to FIGS. 1-2, the handle portion 108 may also include the handle portion 108 defining the handle axis 210 that spans through a centroid 212 defined thereon. The handle axis 210 would then be disposed at the substantially perpendicular angle 128 with respect to the funnel axis 130. The centroid 212 would be generally defined by the geometric shape on the upper surface or width along the handle, but may also be defined by the geometric shape defined by the body of the handle portion 108. As best seen in FIG. 2 and FIG. 5, the handle axis 210 and the funnel axis 130 are also preferably, but not necessarily, substantially co-planar with one another. Said another way, the funnel axis 130 may co-planar with the handle axis 210, or may offset a distance 500 of approximately 1-2 inches therefrom.

Although a specific order of executing steps have been described herein, the order of executing the steps may be changed relative to the order shown in certain embodiments. Also, two or more steps shown in succession may be executed concurrently or with partial concurrence in some embodiments. Certain steps may also be omitted for the sake of brevity. In some embodiments, some or all of the process steps can be combined into a single process.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. A powder scooper with a funnel comprising:
   a unitary body with a scooping portion having a bottom wall and a sidewall surrounding the bottom wall and both defining a scooping cavity, the sidewall defining a singular funnel entrance aperture and having an upper terminal edge defining an upper aperture;
   a funnel portion coupled to the sidewall, having a distal terminal end defining a distal opening, and defining a funnel channel separating the singular funnel entrance aperture and the distal opening, the funnel portion extending outwardly away from an outer surface of the sidewall;

a hood portion with a lower end coupled to the upper terminal edge of the sidewall, partially covering the upper aperture to define an entrance aperture, and disposed directly above a portion of the sidewall defining the singular funnel entrance aperture; and a handle portion coupled to, and extending outwardly away from, the outer surface of the sidewall in a substantially perpendicular orientation and angle of a funnel axis defined by the funnel channel.

2. The powder scooper with a funnel according to claim 1, wherein:

the scooping cavity is of a hemi-spherical shape.

3. The powder scooper with a funnel according to claim 1, wherein the hood portion further comprises:

a hood wall with a continuous outer perimeter edge defining the entrance aperture, the hood wall extending upwardly away from the portion of the sidewall defining the singular funnel entrance aperture.

4. The powder scooper with a funnel according to claim 3, wherein the hood portion further comprises:

an inner surface of a concave shape.

5. The powder scooper with a funnel according to claim 4, wherein the hood portion further comprises:

an outer lip disposed proximal to handle plane defined by a handle axis of the handle portion.

6. The powder scooper with a funnel according to claim 4, wherein the hood portion further comprises:

an outer surface of a concave shape.

7. The powder scooper with a funnel according to claim 1, wherein the handle portion further defines:

a handle axis spanning through a centroid defined thereon, the handle axis disposed at the substantially perpendicular angle with respect to the funnel axis.

8. The powder scooper with a funnel according to claim 7, wherein:

the handle axis and the funnel axis are substantially co-planar.

9. The powder scooper with a funnel according to claim 1, wherein:

the outer surface of the sidewall includes a plurality of measurement indicia disposed thereon and located on an opposing side of the sidewall defining the singular funnel entrance aperture.

10. The powder scooper with a funnel comprising:

a unitary body with a scooping portion having a bottom wall and a sidewall surrounding the bottom wall and both defining a scooping cavity, the sidewall defining a funnel entrance aperture and having an upper terminal edge defining an upper aperture;

a funnel portion coupled to the sidewall, having a distal terminal end defining a distal opening, and defining a funnel channel separating the singular funnel entrance aperture and the distal opening, the funnel portion extending outwardly away from an outer surface of the sidewall;

a handle portion coupled to, and extending outwardly away from, the outer surface of the sidewall in a substantially perpendicular orientation and angle of a funnel axis defined by the funnel channel; and a hood portion with a lower end coupled to the upper terminal edge of the sidewall, partially covering the upper aperture to define an entrance aperture, and disposed directly above a portion of the sidewall defining the funnel entrance aperture.

11. The powder scooper with a funnel according to claim 10, wherein:

the funnel entrance aperture is a singular aperture defined thereon.

12. The powder scooper with a funnel according to claim 11, wherein the hood portion further comprises:

a hood wall with a continuous outer perimeter edge defining the entrance aperture, the hood wall extending upwardly away from the portion of the sidewall defining the singular funnel entrance aperture.

13. The powder scooper with a funnel according to claim 12, wherein the hood portion further comprises:

an inner surface of a concave shape.

14. The powder scooper with a funnel according to claim 12, wherein:

the hood portion is selectively removably coupled to the upper terminal edge of the sidewall in a snap-tight configuration.

15. The powder scooper with a funnel according to claim 12, wherein the hood portion further comprises:

an outer lip disposed proximal to handle plane defined by a handle axis of the handle portion.

16. The powder scooper with a funnel according to claim 15, wherein the hood portion further comprises:

an outer surface of a concave shape.

17. The powder scooper with a funnel according to claim 16, wherein the handle portion further defines:

a handle axis spanning through a centroid defined thereon, the handle axis disposed at the substantially perpendicular angle with respect to the funnel axis.

18. The powder scooper with a funnel according to claim 17, wherein:

the handle axis and the funnel axis are substantially co-planar.

* * * * *